C. A. HANSER.
ARRANGEMENT FOR HYDRAULICALLY WEIGHING LOADS HANGING IN CRANES.
APPLICATION FILED JULY 18, 1919.
1,435,603.
Patented Nov. 14, 1922.
3 SHEETS—SHEET 3.
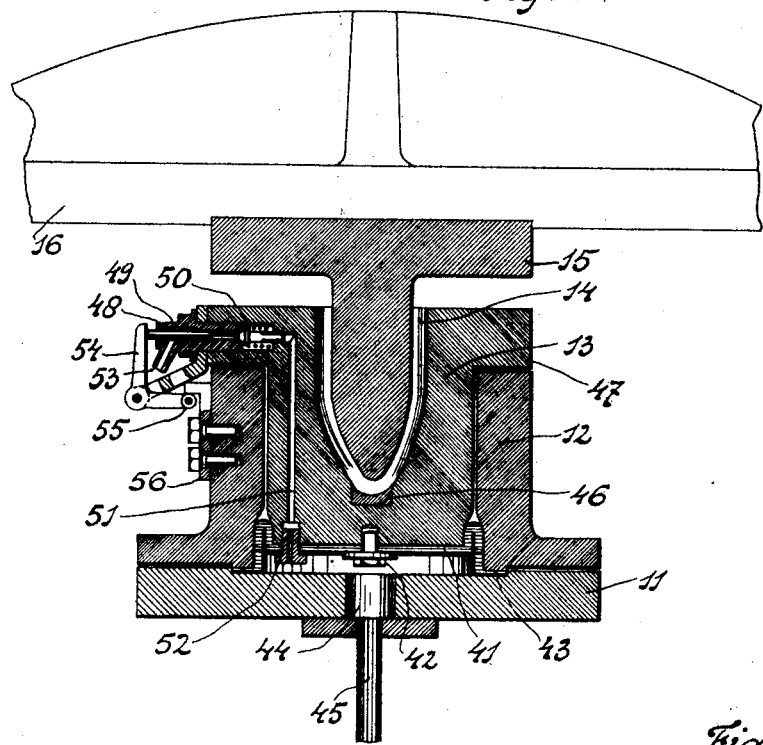
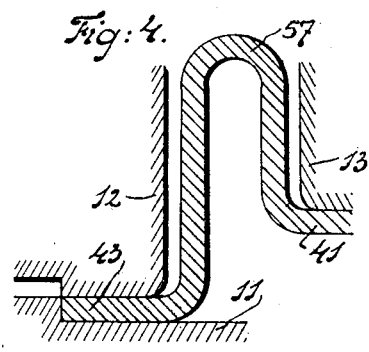
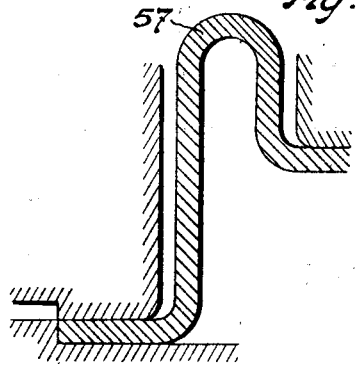
Inventor
Charles Alfred Hanser
By Glenn S. Noble
Att'y.

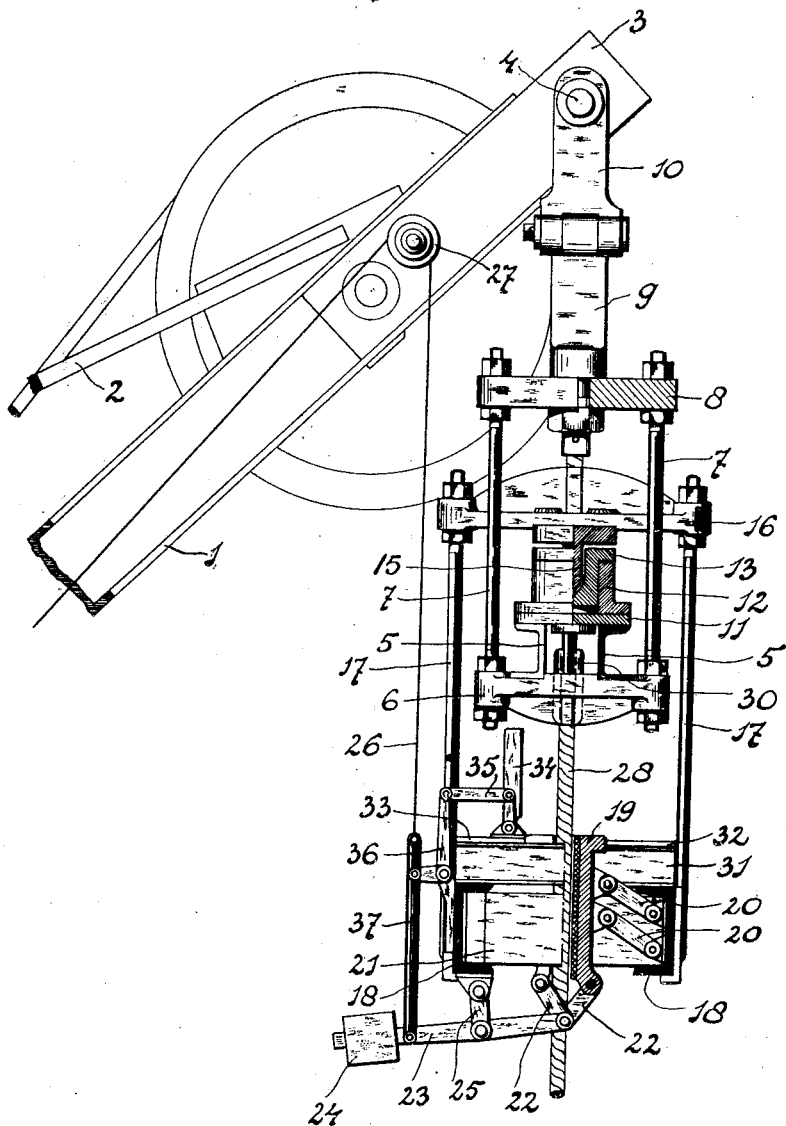

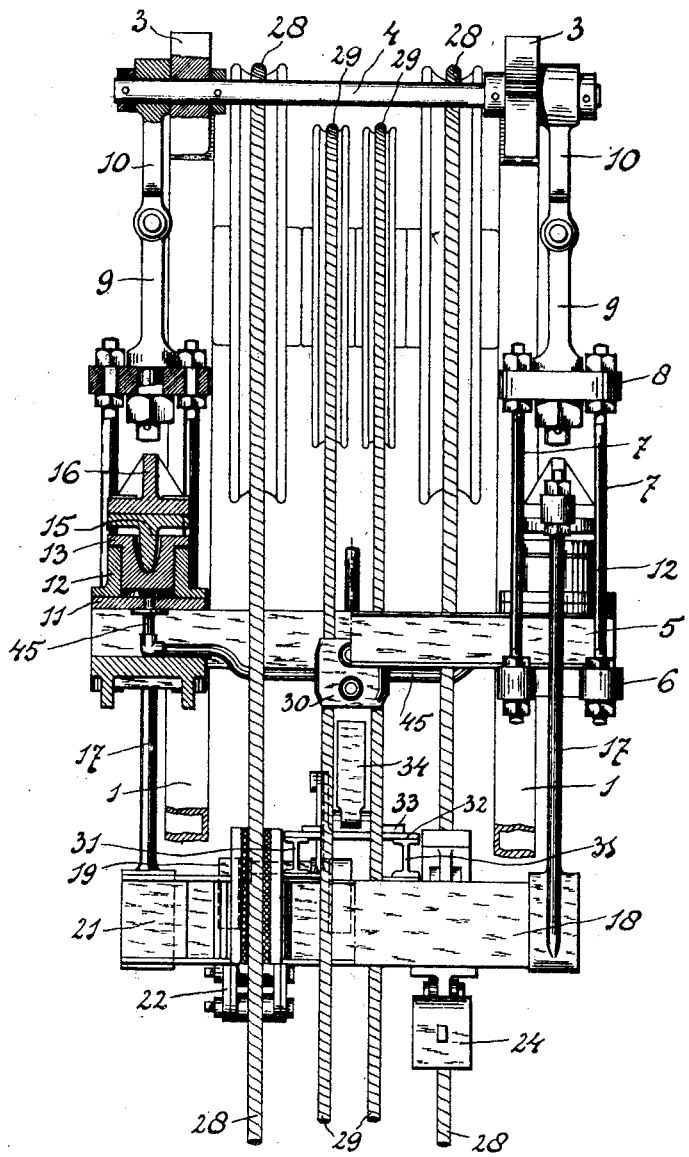

Patented Nov. 14, 1922.

1,435,603

UNITED STATES PATENT OFFICE.

CHARLES ALFRED HANSER, OF ROTTERDAM, NETHERLANDS.

ARRANGEMENT FOR HYDRAULICALLY WEIGHING LOADS HANGING IN CRANES.

Application filed July 18, 1919. Serial No. 311,871.

*To all whom it may concern:*

Be it known that I, CHARLES ALFRED HANSER, a subject of the King of Great Britain and Ireland, residing at Rotterdam, the Netherlands, have invented certain new and useful Improvements in an Arrangement for Hydraulically Weighing Loads Hanging in Cranes, of which the following is a specification.

This invention relates to a method and arrangement for hydraulically weighing loads hanging in cranes before or after hoisting or when stopping, whilst hoisting.

The invention specially has for its object to provide such an arrangement on cranes, which easily and at any time can be removed and applied to another crane and which enables at every desired moment, independent of the position of the load relative to the crane or of the position of the crane itself to control in a most easy and very simple way, viz only by reading off one or more pressure gauges, the exact weight of the load hanging in the crane. For this purpose it is only necessary, that the hoisting-cable stops for a short moment, during which the weighing is effected, whereafter the load immediately may be moved again.

The method according to this invention consists more particularly thereof, that, only for the purpose of weighing, the weight of the load temporarily is placed on a carrying-device, which hydraulically is mounted on a suspending-device connected with the crane and whereby the pressure effected by the carrying-device on the suspending-device is measured by hydraulic means.

The carrying device is characterized in this, that it bears on pistons, which are moving in such a way in cylinders, filled with pressure-liquid and open at one side, that when a too heavy contra-pressure arises the superfluous pressure-liquid automatically is removed.

The piston itself fits with play in the cylinder and is provided at the bottom with an U-leather packing bent between the piston and the cylinder. The free edge of this packing is firmly clamped between the cylinder and the cylinder cover; the piston being hollowed to receive a cone-shaped supporting pivot of the carrying device.

The space beneath the piston communicates by means of a canal, provided in the piston, with an outlet opening arranged in said canal which permanently is closed by a valve, said valve automatically being opened by means of a lever system at a too high position of the piston.

A further feature of the invention consists thereof, that the temporary transmission of the weight of the load upon the carrying device is effected by means of a claw-clutch, which co-operates with a clamping-stop arranged at the hoisting-cable, said clamping-stop being stopped by a member attached to the carrying device whereby the clutch, moved from the attendance place of the driver slowly pays out the cables, on which the load is suspended, until the clamping stop, which then takes up the whole weight of the load is kept firm by the carrying device.

On the accompanying drawing the invention is further illustrated.

Fig. 1 shows the top part of a crane, with a side view and partly sectional of the arrangement, Fig. 2 gives a front view of Fig. 1, and some parts in section, Fig. 3 shows a section of a detail on a larger scale, Figs. 4 and 5 represent two different positions of a part of the U-leather packing.

It is supposed, that the crane, the construction form of which is taken as an example, serves to operate with a so called grip for the operation of which four cables are required, the two outside cables being adapted to keep the grippers tight during hoisting and to open them again to remove the load. The two middle cables are adapted to suspend the grips when unloading them and to open them by paying out the side cables. The contra-weight carrying the pulleys over which the outside cables run is then caused to descend and the pincers run open, pivoting by means of the gripper arms.

The chosen kind of crane possesses a double crane arm 1 with a connecting rod 2. Each arm is provided with an extension 3, which is firmly connected to the crane arm. Through the ends of these extensions a fixed shaft 4 is passed on which the carrying-device is suspended.

The carrying-device itself consists of two parallel beams 5, placed next one another the ends of which are carried by cross members 6, which each, by means of four connecting rods 7, are connected to a carrying member 8. Each carrying member 8 is connected to an interposed suspension member 9, firmly screwed to the carrying member 8 and connected to the proper suspension member 10 by means of a pin and eye. The members 10 can swing around the shaft 4 (Fig. 1). Because the suspension member 10 can swing around the shaft 4, and the interposed member 9 by means of the winged connection, can swing relative to the member 10, it is evident, that the carrying member 8 and consequently also the cross members 6 can make every movement in a horizontal plane. As each of the beams 5 are supported at their ends by a cross member 6 it is evident, that the beams 5 not only are allowed to swing relative to the fixed shaft 4, but also are movably suspended in longitudinal direction of the shaft 4, consequently the whole carrying device being movable in a horizontal plane. On the beams 5 at both sides of their extremity supporting plates 11 are arranged, which preferably have a square form and upon each of which a cylinder 12 is mounted, in which a piston 13 is located in a special way.

This special construction of piston and cylinder will be described more explicitly hereafter.

The piston 13 is provided with a conical hole 14, to receive a supporting pivot 15 of the suspension device.

The suspension device comprises a double carrier 16, which by means of connecting rods 17 is connected to two supporting beams 18, which consequently are supported at four sides. Upon these beams 18 a double constructed clamping device is arranged. Each clamping device is composed of two clamping-irons 19, the most upper part of which is connected by means of upwardly inclined and movable levers 20 to a casing 21, which is enclosed between the supporting beams 18. The clamping irons are provided with brass or copper lining plates, to facilitate the sliding of the cable. The lower part of the clamping-irons is by means of movable rods 22 connected to the extremity of a tumbler lever 23, which is provided with a weight 24 and adapted to turn by means of a suspension rod 25, which on its turn is connected by suitable means to the casing 21. Near to the weight 24 a draw-bar 37 attached to a hauling cable 26 is connected to the tumbler lever 23, said hauling cable being conducted over a roller 27, fixed to the crane arm 1, to the attendance place of the crane driver. As two hoisting cables 28 and two gripper cables 29 are provided (Fig. 2), it needs not to be mentioned, that the hereabove described parts are all double.

In order to stop the gripper cables 29, each of these cables is provided with a clamping stop 30 of such dimensions, that it easily can pass through between the two supporting beams 18. Upon these latter other cross beams 31 are arranged, upon which two supporting plates 32 and 33 are placed. The supporting plate 32 is adapted to carry a pivotable support 34, fixed to the supporting plate 33 and which, when not in use, is adapted to take a vertical position. The support 34 is by means of a rod 35 connected to a tumbler lever 36, which also is connected to the already mentioned draw-bar 37.

Fig. 3 represents the cylinder 12 and its parts on a larger scale. The piston 13 fits with play into the cylinder 12, which exactly joins with the supporting plate 11 and which consequently may serve as cylinder cover. At the upperside the cylinder is open. To the underside of the piston 13 a disc 41 of leather is fixed by means of a screwbolt 42 with a large washer. The disc of leather 41 is bent in the form of a U-leather packing around the somewhat decreased underside of the piston 13 and returns downwardly in a recess of the cylinder 12, being finally clamped firm in a groove between the cylinder and the plate 11. This connection is represented in Fig. 4 on a larger scale. The leather packing is therefore clamped on two places and further connected with the bottom of the piston 13, so that the part of the packing is bent by 57 wholly movable, and according to the position of the piston can freely move without causing friction. The cylinder 12 may be fixed to the supporting plate 11, in any suitable way by means of bolts or the like. At the most low position of the piston 13 there still remains in the cylinder 12 a space, which by means of an opening 44 arranged in the supporting plate 11, communicates with a supply pipe 45 (Fig. 3). In the bottom of the cup-shaped hole 14 of the piston an inlead piece 46 of hardened steel is placed, on which the point of the supporting pivot 15 is adapted to bear. For clearness sake the carrier 16 is shown in Fig. 3 in somewhat lifted-up position.

The piston 13 at the upper side is provided with a collar 47, this part of the piston thus obtaining the same width as the cylinder.

In this collar 47 a valve casing 48 is screwed, in which is arranged a valve 50, provided with a spindle 49 and which is kept close under the influence of a spring. The valve 50 is situated opposite the upper end of a passage 51, formed in the piston 13 and communicating with a perforated plug 52, which is screwed near the screwbolt 42 through the disc of leather 41 in the piston 13. The valve casing has a nozzle 53, to which a discharge pipe may be connected. The spindle 49 of the valve 50 bears with its end against an arm of a tumbler 54, said arm carrying a roller 55, abutting against an adjustable stop 56 fixed to the outer jacket of the cylinder 12.

The whole arrangement is constructed in such a way, that the whole is allowed to swing in every direction by means of the shaft 4, suspended at the extension 3, said extension being easily and rapidly by means of bolts or the like fixed to or removed from every existing crane.

Should several cranes already be provided with an extension, either only the shaft 4 has to be disengaged, whereafter the arrangement as one whole may be taken off and removed or the shaft 4 may remain at its place and only the extensions 3 are disengaged and removed and mounted on another crane. The clamping stop 30 is by means of bolts fixed to the cables 29 and can be easily released, whereas the clamping irons 19 may be moved so far away, from each other, that the eye and thimble, for the connection to the grips, easily can be passed through the clamping irons.

The arrangement now is operated as follows:

If the cables 28 carry a grip, which is kept close through the gripper cables 29 and pressure liquid is admitted beforehand to the supply pipe 45, so that as to say the piston 13 floats in the cylinder 12 and the weight of the lifted load is wanted on a certain moment, then the cable 26 is pulled, which causes the rod 37 to move upwardly. This movement causes two other movements (while the clamping devices are double in the following is spoken only of one clamping device); by the first movement the weight 24 and consequently the tumbler lever 23 go upwards causing the levers 22 and also the levers 20 to go downwards, whereby the clamping iron 19 descends so far until the copper lining plates become in touch with the cable 28 braking thereby its movement (Fig. 1). The cable 28 now slides slowly downwards. In the mean time also the gripper cable 29 has descended and with it the clamping stop 30 (Fig. 2). Owing to the upward movement of the rod 37, the tumbler 36 (Fig. 1) is moved to the right, whereby the rod 35 also moves to the right which causes the support 34 to fall down, which consequently is left down upon the supporting plate 32. Owing to the friction between the cable 28 and the copper plates of the clamping irons 19, the whole load slides slowly somewhat down so far, until the clamping stop 30 rests upon the support 34. The result thereof is, that the weight of the load no more is suspended at the cables 28, but now acts on the cables 29, whereby the whole weight of the load, which was suspended at the cables 28 and the gripper cables 19, now is received by the supporting beams 18 and consequently is transferred by the connecting rods 17 on the carrier 16 and from there on the supporting pivot 15 and the piston 13.

Now the pressure liquid is admitted through the supply pipe 45, which causes the piston 13 to rise (Fig. 3). During this rising however the roller 55 abuts against the stop 56, whereby, when the piston 13 still rises more, the spindle 49 of the valve 50 is pressed inwardly by the tumbler 54. This allows the pressure liquid to blow through the plug 52 and the passage 51 through the valve 50 and the nozzle 53 to a discharge pipe not shown in the drawing.

It is evident, that at a determined pressure in the supply pipe 45, which pressure by means of pressure gauges can be read off, such a position of the piston 13 can be obtained, that just a little liquid is removed through the nozzle 53. The pressure, which then reigns in the supply pipe 45, corresponds to the pressure momentarily effected by the piston upon the pressure liquid consequently to the pressure of the pivot 15 upon the inlead piece 46 of hardened steel, viz., to the weight of the load suspended at the cables.

After reading off the pressure of the liquid, which pressure for example immediately is indicated in kilogrammes on the pressure gauges, the cable 26 can be released, whereby the rod 37 moves downwards, the supporting iron 34 being lifted up in the position as shown in Fig. 1, after the cable 29 with the clamping stop 30 first somewhat is lifted up. Further on the clamping iron 19 is removed again from the cable 28 by acting on the rod 37, whereafter the cable 28 can move unhindered again just as the gripper cable 29.

It is clear from what is said hereabove, that in any position of the load the weight can be controlled, if only care is taken, that when operating the cable 26, the clamping stop 30 finds itself somewhat above the supporting iron 34.

It is easily understood, that under normal circumstances the main load is carried by the side-cables, whilst the load is lifted up. Both the middle cables only serve to receive the main load during the weighing.

It is evident, that the described arrangement, except with cranes, whereby four cables are wanted for the grippers, also can be applied to cranes, whereby one or two cables are used.

As the discharge pipe of the pressure liquid from the nozzle 53 is guided along the crane arm 1 downwardly it is preferred, as shown in Fig. 2 to conduct the mutual supply pipe also along the upper end of the crane. A mutual supply pipe may be used, which may be branched off in the middle of the beams 5 or two supply pipes, for each cylinder one, may be applied.

From the above described it appears, that the apparatus easily can be transferred and removed from one crane to the other.

The weighing always is effected in vertical position, but independent from the position in which the crane arm is placed.

The cylinders 12 only are temporarily charged because the load only is supported during the weighing, the arrangement being switched out for the rest. Owing to the special form of the cylinder and the piston the friction is reduced to a minimum. It is excluded that the pistons owing to the pressure charge should topple over.

The packing or disc of leather 41 is constructed and fixed in such a way (see Fig. 4), that the piston 13 in each position and with each pressure of the liquid always is subjected to the same friction, which, as the piston moves with play in the cylinder and the supporting point of the pivot is situated very low, will be practically very small. Fig. 5 shows the form of the U-leather packing at the highest position.

If oil is used as pressure liquid, and some oil should leak through the leather packing, this would not do any harm to the exact working of the arrangement, as the piston and the cylinder would be lubricated by the leaking pressure liquid.

Because the piston only can reach a certain height and operates without stop block, the advantage is obtained, that the cylinders and the pressure liquid piping during the pumping of the cylinders never can be subjected to an unnecessary high charge.

Owing to the special construction of the piston during frosty weather a circulating stream of the preheated pressure liquid can take place, which only need to be interrupted during a short interval whilst weighing the load.

From a practical view it is preferable to keep the pipings for the cylinders separate from each other, which enables one to control by means of a combined pressure gauge the exact mean-pressure.

What I claim as my invention and desire to secure by Letters Patent is:

1. In a hydraulic apparatus for weighing loads hanging in cranes, the combination of a carrying device, means for temporarily transferring the load to the carrying device, hydraulic means for mounting the carrying device on a suspension device connected to the crane, the arrangement being such that the pressure produced by the carrying device on the suspension device may be hydraulically controlled.

2. In a device of the character set forth, the combination of a cylinder, a piston fitting loosely in said cylinder, a packing at the bottom of the cylinder which engages with the piston and is folded between the piston and cylinder, a cover for the bottom of the cylinder, the outer edge of the packing being clamped between the cylinder and cover, said piston having a recess in the top thereof, a carrying device and a conical supporting pivot secured to the carrying device and engaging with the recess.

3. In an apparatus of the character set forth, the combination of a cylinder, a piston in said cylinder, an outlet at the bottom of the cylinder, a valve for said outlet, and means for opening the valve automatically when the piston reaches a predetermined point.

4. In a weighing device of the character set forth, the combination of a carrying device, a clutch for temporarily transmitting the weight of the load to the carrying device, a hoisting cable, a clamping stop on the cable which coacts with the clutch and is adapted to be stopped by the carrying device, means whereby the clutch may be actuated by the operator to slowly pay out the cable which carries a part of the load until the clamping stop engages with the carrying device.

In testimony whereof I have affixed my signature.

CHARLES ALFRED HANSER.